United States Patent [19]

Finken

[11] 4,455,986

[45] Jun. 26, 1984

[54] ENGINE FUEL SUPPLY SYSTEM

[76] Inventor: Elmer G. Finken, 601 5th St., NE., Montgomery, Minn. 56069

[21] Appl. No.: 455,965

[22] Filed: Jan. 6, 1983

[51] Int. Cl.³ .......................................... F02M 31/00
[52] U.S. Cl. ................................. 123/557; 123/558; 123/578
[58] Field of Search ............... 123/557, 525, 523, 522, 123/524, 575, 576, 578; 261/DIG. 83, 144, 145, DIG. 8

[56] References Cited

U.S. PATENT DOCUMENTS

| | | | |
|---|---|---|---|
| Re. 26,186 | 4/1967 | McQuerry | 123/557 |
| 1,147,608 | 7/1915 | Clark | 123/557 |
| 1,470,204 | 10/1923 | Swartz | 123/557 |
| 1,470,461 | 10/1923 | MacLean | 123/557 |
| 1,542,823 | 6/1925 | Manville | 123/557 |
| 2,087,616 | 7/1937 | Mueller | 123/557 |
| 2,617,633 | 11/1952 | Van Den Bosch | 261/145 |

FOREIGN PATENT DOCUMENTS 178553  4/1922  United Kingdom ................ 123/557

*Primary Examiner*—Ronald H. Lazarus
*Attorney, Agent, or Firm*—Kinney & Lange

[57] ABSTRACT

An engine fuel supply system for an internal combustion engine having an intake manifold, intake ports open to the intake manifold, an exhaust manifold and exhaust ports open to the exhaust manifold. The fuel supply system includes an enclosed heat exchange chamber heated by the exhaust gases from the exhaust manifold, a fuel vapor generator having a heat conductive fuel vaporizing conduit leading straight through the heat exchange chamber and the wall of the intake manifold to discharge fuel vaporized in the heat exchange chamber through a restricted orifice directly into the intake ports inside of the manifold.

12 Claims, 3 Drawing Figures

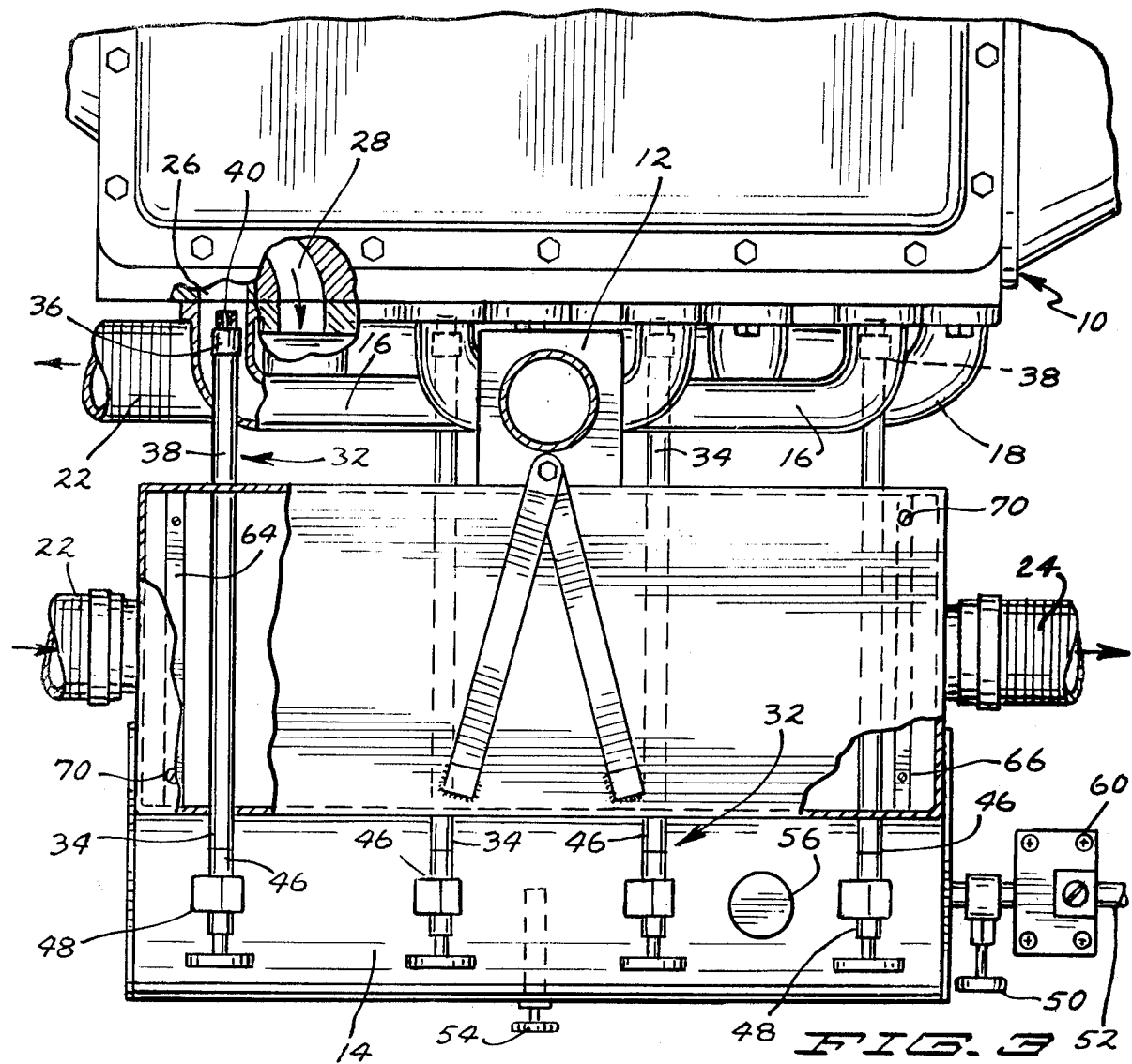
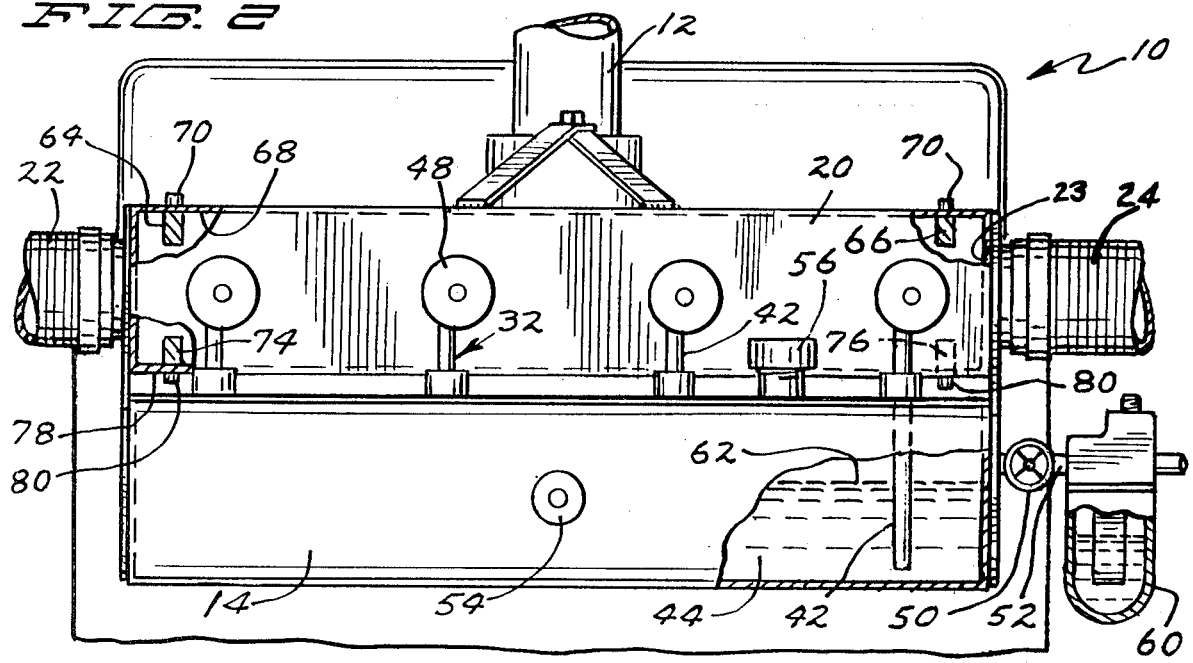

ENGINE FUEL SUPPLY SYSTEM

BACKGROUND OF THE INVENTION

1. Field of the Invention

This invention has relation to liquid fuel vaporizing systems for use with internal combustion engines.

2. Description of the Prior Art

A complete gasification or vaporization of gasoline or other liquid hydrocarbons in a proper mixture with air has been a goal sought after in the operation of internal combustion engines in order to improve economic efficiency and to achieve relatively complete combustion of the fuel with minimum polluting combustion products. There have been many schemes and systems suggested and tested to reach this result. The following examples were identified in a search of the prior art.

The patent to Wichman et al, U.S. Pat. No. 4,151,821, granted May 1, 1979, discloses use of a nozzle to spray liquid gasoline onto a hot surface at high velocity so that the gasoline is "broken down into substantially molecular particles to produce a dry gas".

The patent to Authement et al, U.S. Pat. No. 3,963,013, granted June 15, 1976, presents apparatus for heating induction air and spraying heated liquid fuel into the heated air.

In the patent to Ehresmann, U.S. Pat. No. 4,249,501, granted Feb. 10, 1981, raw fuel is heated by the engine coolant before being supplied to a carburetor.

The patent to Davison et al, U.S. Pat. No. 4,216,751, granted Aug. 12, 1980, discloses the heating of gasoline by passing it through a jacket surrounding an exhaust pipe, allowing the gasoline to vaporize, and passing the vaporized gasoline to a standard carburetor to be mixed with air.

In the patent to Waschkuttis, U.S. Pat. No. 4,276,864, gasoline is fed into a "boiling tank" which is inside of a manifold heated by exhaust gases. The gasoline vaporizes inside of the boiling tank and is introduced into a carburetor where it is mixed with air and subsequently enters an intake manifold.

The patent to Hawryluk, U.S. Pat. No. 4,030,457, granted June 21, 1977, discloses an arrangement whereby the air/gas mixture from a conventional carburetor is heated by exhaust gases before being introduced into an intake manifold.

Applicant and those in privity with him are aware of no prior art which is closer than that identified above or discussed herein, and they are aware of no prior art which anticipates the claims herein.

SUMMARY OF THE INVENTION

A fuel supply system for an internal combustion engine having intake ports and exhaust ports open to an intake manifold and an exhaust manifold, respectively, includes a fuel tank with a supply of gasoline or other volatile liquid fuel in it, and a fuel vapor generator for each intake port open from below the surface of the gasoline in the tank and through the outer wall of the intake manifold to position adjacent its intake port.

Each fuel vapor generator includes a heat conductive fuel vaporizing conduit having a first gaseous fuel discharge end portion adjacent the intake port and a second liquid fuel entry end portion, a gaseous fuel delivery plug in the first end portion of the vaporizing conduit, the plug having a restricted gaseous fuel discharge orifice therethrough, and the fuel vapor generators also including at least one liquid fuel delivery conduit open from below the gasoline in the tank to the second end of each of the vaporizing conduits.

There is an enclosed heat exchange chamber encompassing each of the fuel vaporizing conduits, and an exhaust pipe open from the exhaust manifold to an inlet opening of the heat exchange chamber. In the form of the invention as shown, the heat exchange chamber is provided with an outlet opening spaced from its inlet opening, and an exhausted combustion products discharge pipe opens from the heat exchange chamber outlet opening to the atmosphere.

Also in the form of the invention as shown, each fuel vaporizing conduit runs in a straight line from its second end portion to its first end portion entirely through the heat exchange chamber and the outer wall of the intake manifold, and the restricted orifice of the fuel delivery plug is situated generally in alignment with the longitudinal axis of the fuel vaporizing conduit and in position to deliver gaseous fuel along that axis within the intake manifold directly into the intake port.

BRIEF DESCRIPTION OF THE DRAWINGS

FIG. 2 is a fragmentary front elevational view taken on the line 2—2 in FIG. 1. with parts in section and parts broken away; and FIG. 3 is a top plan view of the apparatus of FIGS. 1 and 2 with parts in section, parts broken away and parts omitted.

DETAILED DESCRIPTION OF THE PREFERRED EMBODIMENTS

Figure 1:
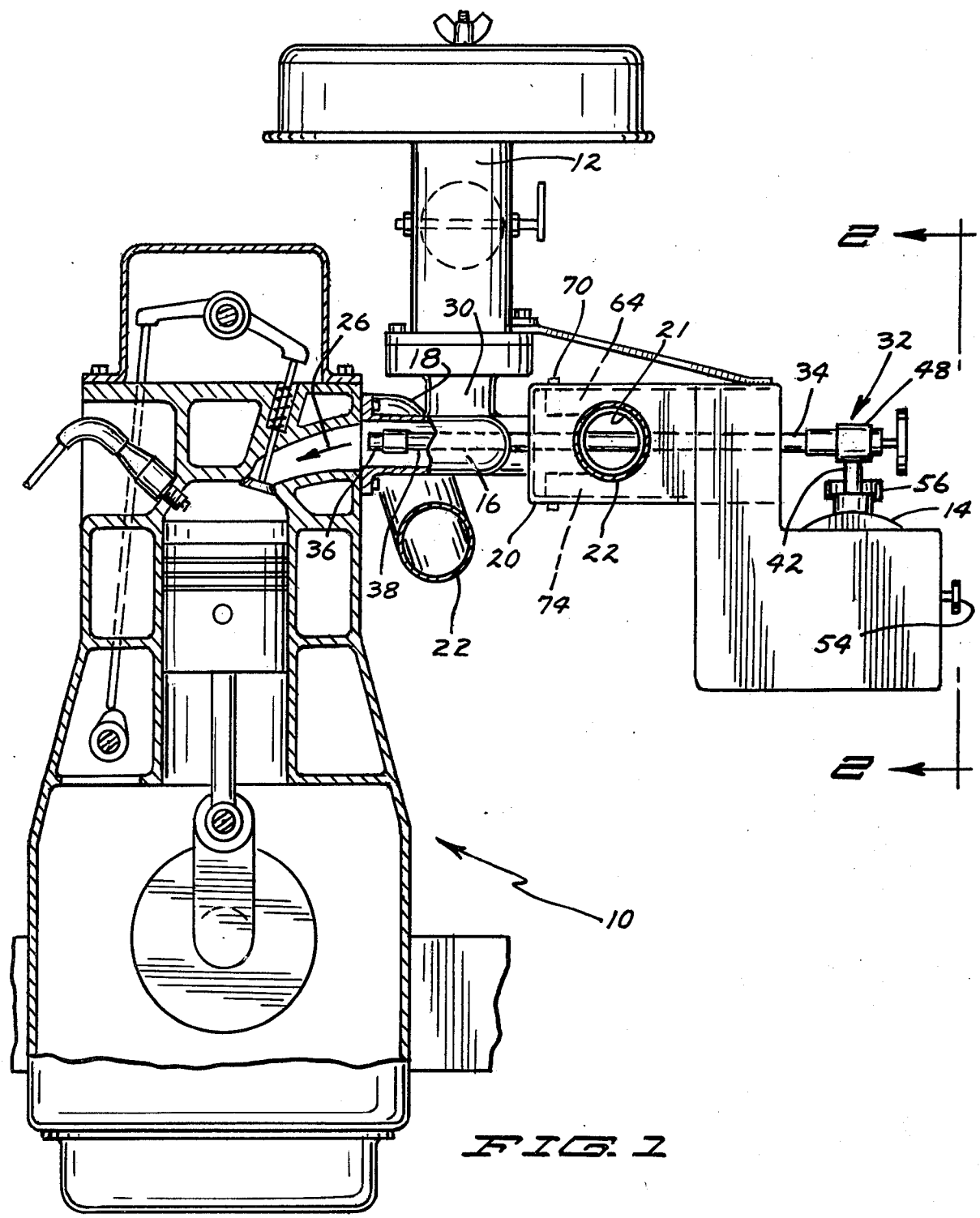
FIG. 1 is an end elevational view of the apparatus of the fuel system of the invention shown in relationship to an internal combustion engine and a conventional carburetor, with parts in section and parts broken away.

An operative prototype embodying the elements of the invention includes an automobile engine 10, a carburetor 12, a fuel tank 14, an intake manifold 16, an exhaust manifold 18, a heat exchange chamber 20, an exhaust pipe 22 open from the exhaust manifold to an inlet opening 21 of the heat exchange chamber, and a combustion products discharge pipe 24 open from an outlet opening 23 of chamber 20 to an area for discharge of exhausted products of combustion (not specifically shown).

The interior of intake manifold 16 is open into four intake ports 26. See FIGS. 1 and 3. Exhaust ports 28 open into the interior of exhaust manifold 18. See FIG. 3. A carburetor down draft tube 30 also opens into the intake manifold to supply air thereto in a more or less conventional manner.

There is a separate fuel vapor generator 32 associated with each of the intake ports 26. These vapor generators 32 each include a straight, horizontally extending, heat conductive, fuel vaporizing conduit 34. A gaseous fuel delivery plug 36 is threadably mounted in a first end portion 38 of each vaporizing conduit 34, and each is provided with a gaseous fuel discharge orifice 40 of severely restricted diameter therethrough, this orifice being in concentric alignment with the longitudinal axis of the vaporizing conduit 34. Plugs 36 are removably mounted in the first end portions of the vaporizing conduits so that different orifice diameters can be used, at least for experimental purposes. Orifice diameters of 0.0302 inches, 0.76708 mm; 0.0232 inches, 0.58928 mm; 0.0217 inches, 0.55118 mm; and 0.0015 inches, 0.0381 mm have been used; but it is to be understood that other sizes of orifice may work just as effectively as the testing of the invention continues.

In order to concentrate the flow of exhaust gases on the portions of the fuel vaporizing conduits 34 inside of the heat exchange chamber 20, the vaporizing conduits 34 lie in a single horizontal plane, and heat exchange chamber inlet opening 21 and outlet opening 23 conduct the gases substantially across that plane. To further concentrate the flow of exhaust gases on the horizontal plane of the vaporizing conduits 34, an upper inlet baffle 64 and an upper outlet baffle 66 are affixed to an upper horizontal wall 68 of the heat exchange chamber 20 by fasteners 70; and a lower inlet baffle 74 and a lower outlet baffle 76 are affixed to a lower horizontal wall 78 of the heat exchange chamber 20 by fasteners 80. The positioning of these baffles is perhaps most clearly seen in FIG. 2.

The fuel vapor generators 32 also include a liquid fuel delivery conduit 42 open from below a top surface 62 of gasoline 44 or other volatile liquid fuel in the fuel tank 14 to a second end portion 46 of the fuel vaporizing conduit 34. In the prototype of the invention here shown, a cutoff and variable adjustment needle valve 48 forms a restrictor means between the liquid fuel delivery conduit 42 and the fuel vaporizing conduit 34.

A fuel cutoff valve 50 is situated in a fuel supply line 52 which leads from a bulk storage fuel tank or other source of a large volume of fuel (not shown) to a bottom portion of the fuel tank 14. Tank 14 is fitted with a manually operable pressure pump 54 of a type customarily used to pressurize camp stoves, in this prototype model herein disclosed. In order to pressurize tank 14 with pump 54, the fuel cutoff valve 50 will be in its closed position.

The fuel supply system of the invention has been found to work effectively both with the fuel tank 14 pressurized and with it operating at atmospheric pressure. The fuel tank 14 is provided with a filler cap 56. To operate briefly at atmospheric pressure, fuel cutoff valve 50 can be closed and the filler cap can be loosened to allow passage of air therethrough.

To allow operation for extended periods either under atmospheric pressure with the filler cap partially opened, or under pressure with the filler cap closed, a carburetor type float valve 60 is provided in the fuel supply line 52 between fuel cutoff valve 50 and a bulk storage fuel tank or other source of fuel (not shown). This float valve 60 can be of any usual or preferred construction forming no part of the present invention per se, and will serve to keep the top surface 62 of gasoline 44 in the fuel tank 14 approximately as indicated in FIG. 2.

OPERATION

The engine 10 can be started initially by use of a standard or conventional carburetor 12, and by supplying gasoline to that carburetor in any usual or preferred manner (not shown) as is suggested in some of the prior art above referred to; or it can be started by turning the engine over with the starter in the usual way and drawing raw liquid gas in through the fuel vapor generators 32, through the intake manifold 16 and into the intake ports 26. Initially this second method of starting will result in unwanted inefficiencies in burning of the fuel, and some means of controlling the volume of raw gasoline fed to the engine using this method is still to be devised.

After the engine has been started and has warmed up, the products of combustion leaving the exhaust ports 28 and passing through the exhaust manifold 18 and exhaust pipe 22 will bring the temperature inside of the heat exchange chamber 20 up to something approaching the temperature of the exhaust gases. This will rapidly cause the gasoline inside of the fuel vaporizing conduits 34 to flash over from liquid to gaseous state, so that the fuel being discharged through the orifice 40 in each gaseous fuel delivery plug 36 will soon be a virtually dry gas. This dry gaseous fuel will mix with the air being supplied by the carburetor 12 to enter the intake ports 26 in such a condition as to be completely burned upon ignition within the cylinders of the engine.

After operation for a very short period of time, the engine casting including that portion defining the intake ports 26 and the cylinder walls will be sufficiently higher than the boiling point or vaporization point of the gasoline so that there will be no recondensation and so no globules of raw gasoline present in the mixture drawn into the cylinder for ignition and burning.

Therefore, upon refinement of the controls to obtain precisely the correct air/gas ratio, complete burning of all of the fuel can be obtained. This will result in maximum fuel economy with the discharge of a minimum of pollutants from the exhaust manifold 18 and, consequently, from the combustion products discharge pipe 24.

It is important to note that the gaseous fuel is being discharged in immediate relationship to the intake ports 26, and that this reduces the opportunity for the gaseous fuel to be recondensed to form liquid particles. In fact, introduction of the gaseous fuel directly in line with the intake port substantially eliminates opportunity for recondensation to take place before the fuel/air mixture arrives in the cylinder where the temperature is very substantially above that of the vaporization point of the fuel.

The exact function of the restrictor in the form of the needle valve 48 is not presently understood, and operation of the system of the invention proceeds satisfactorily when that valve is entirely open. It is clear, however, that the restrictor can be important in balancing the flow of liquid gasoline into the fuel vaporizing conduits 34 with the flow of air through the carburetor 12.

The present invention is not limited to the use of intake air at ambient temperatures. In the first place, those portions of the fuel vaporizing conduits 34 extending into the intake manifold 16 will, when carrying the vaporized gas, be at a temperature far above the vaporization point of the gas after the engine has warmed up. In the second place, the air through the carburetor can be preheated in any usual or preferred manner such as suggested by the prior art cited above.

Insulating materials (not shown) encompassing the entire engine and fuel supply system will improve effectiveness of operation; and will assist in imparting the heat of the exhaust gases and of chamber 20 to the intake manifold to tend to preheat the intake air.

Although the present invention has been described with reference to presently preferred embodiments, workers skilled in the art will recognize that changes may be made in form and detail without departing from the spirit and scope of the invention.

What is claimed is:

1. In an engine fuel supply system having a fuel/air intake manifold, at least one engine intake port open to the intake manifold, an exhaust manifold, and at least one exhaust port open to the exhaust manifold, the improvement including:

A. a fuel tank;
B. a supply of volatile liquid fuel in fuel tank;
C. a fuel vapor generator for each engine intake port and open from below the surface of the liquid fuel in the tank through an outer wall of said intake manifold to position adjacent to each intake port, said generator including:
   (1) a heat conductive fuel vaporizing conduit having a first gaseous fuel discharge end portion adjacent the engine intake port and a second liquid fuel entry end portion,
   (2) a gaseous fuel delivery plug in the first end portion of the vaporizing conduit, said plug having a restricted gaseous fuel discharge orifice therethrough, and
   (3) a liquid fuel delivery conduit open from below the liquid fuel in the tank to the second end of the vaporizing conduit;
D. an enclosed heat exchange chamber encompassing each of said fuel vaporizing conduits and having an inlet opening and an outlet opening spaced from the inlet opening;
E. an exhaust pipe open from the exhaust manifold to the heat exchange chamber inlet opening; and
F. the heat exchange chamber outlet opening communicating with a predetermined area for discharge of exhausted products of combustion from the chamber.

2. The structure of claim 1 wherein:
G. said heat conductive fuel vaporizing conduit runs in a straight line from its second end portion to its first end portion entirely through the heat exchange chamber and the outer wall of the intake manifold; and
H. the restricted orifice of the fuel delivery plug is situated generally in alignment with the longitudinal axis of the fuel vaporizing conduit to deliver gaseous fuel along that axis within the intake manifold directly into the intake port.

3. The structure of claim 2 wherein:
I. there is a flow restrictor in the fuel vapor generator between the vaporizing conduit and the liquid fuel delivery conduit.

4. The structure of claim 3 wherein:
J. the flow restrictor in the fuel vapor generator is an adjustable valve.

5. The structure of claim 2 for use with an engine fuel supply system of a multicylinder engine, the system having a plurality of engine intake ports and an equal number of engine exhaust ports, wherein:
I. said heat conductive fuel vaporizing conduits are situated in parallel relation to each other and lie in a single plane;
J. said heat exchange chamber is generally rectilinear in configuration and has an upper chamber wall in parallel spaced relation to the plane of said vaporizing conduits and a lower chamber wall in spaced parallel relation below said vaporizing conduit plane, the heat exchange chamber inlet opening being positioned to direct products of combustion from said exhaust pipe directly on said vaporizing conduits in general alignment with the plane of the vaporizing conduits, and said outlet opening being situated to discharge such products of combustion from the heat exchange chamber in alignment with the conduits generally in general alignment with the plane of the conduits.

6. The structure of claim 5 wherein:
K. said heat exchange chamber is provided with interior baffles to concentrate the flow of exhaust gases between the inlet and outlet openings on the vaporizing conduits.

7. The structure of claim 6 wherein:
L. the baffles in the heat exchange chamber include a pair of horizontally extending baffle plates in parallel, spaced, adjacent relation above and below the heat exchange chamber inlet opening and the vaporizing conduit nearest that opening, a first plate extending downwardly from the upper heat exchange chamber wall and a second plate extending upwardly from the lower chamber wall.

8. The structure of claim 7 wherein:
M. the baffles in the heat exchange chamber include a pair of horizontally extending baffle plates in parallel, spaced, adjacent relation above and below the heat exchange chamber outlet opening and the vaporizing conduit nearest that opening, a third plate extending downwardly from the upper heat exchange chamber wall and a fourth plate extending upwardly from the lower chamber wall.

9. The structure of claim 1 for use with an engine fuel supply system for an engine having but one engine intake port and but one engine exhaust port, wherein:
G. said heat conductive fuel vaporizing conduit runs in a straight line entirely through the heat exchange chamber and the outer wall of the intake manifold; and
H. the restricted orifice of the fuel delivery plug is situated generally in alignment with the longitudinal axis of the fuel vaporizing conduit to deliver gaseous fuel along that axis within the intake manifold directly into the intake port.

10. The structure of claim 1 wherein:
G. means is provided to deliver the supply of volatile liquid fuel from the fuel tank under a greater than atmospheric pressure to the fuel vapor generator.

11. The structure of claim 1 wherein:
G. the fuel tank is open to the atmosphere to cause the liquid fuel to be delivered to the fuel vapor generator at atmospheric pressure due to the reduced pressure in the intake manifold.

12. In an engine fuel supply system having a fuel/air intake manifold and at least one engine intake port open to the intake manifold, the improvement including:
A. a fuel tank;
B. a supply of volatile liquid fuel in fuel tank;
C. a fuel vapor generator for each engine intake port and open from below the surface of the liquid fuel in the tank through an outer wall of said intake manifold to position adjacent to each intake port, said generator including:
   (1) a heat conductive fuel vaporizing conduit having a first gaseous fuel discharge end portion adjacent the engine intake port and a second liquid fuel entry end portion,
   (2) a gaseous fuel delivery plug in the first end portion of the vaporizing conduit, said plug having a restricted gaseous fuel discharge orifice therethrough, and
   (3) a liquid fuel delivery conduit open from below the liquid fuel in the tank to the second end of the vaporizing conduit; and
D. heating means operative to subject substantial portions of said fuel vaporizing conduits to temperatures substantially above the boiling point of said liquid fuel.

* * * * *